(12) United States Patent
Tamir et al.

(10) Patent No.: US 9,842,209 B2
(45) Date of Patent: Dec. 12, 2017

(54) HARDENED EVENT COUNTERS FOR ANOMALY DETECTION

(71) Applicant: McAfee Inc., Santa Clara, CA (US)

(72) Inventors: Eliezer Tamir, Bait Shemesh (IL); Andreas Kleen, Portland, OR (US); Alex Nayshtut, Gan Yavne (IL); Vadim Sukhomlinov, Moscow (RU); Igor Muttik, Aylesbury (GB); Eliel Louzoun, Jerusalem (IL)

(73) Assignee: McAfee, LLC, Santa Clara, CA (US)

( * ) Notice: Subject to any disclaimer, the term of this patent is extended or adjusted under 35 U.S.C. 154(b) by 87 days.

(21) Appl. No.: 14/707,977

(22) Filed: May 8, 2015

(65) Prior Publication Data

US 2016/0328561 A1 Nov. 10, 2016

(51) Int. Cl.
*G06F 21/56* (2013.01)
*G06F 21/55* (2013.01)

(52) U.S. Cl.
CPC .......... *G06F 21/566* (2013.01); *G06F 21/552* (2013.01); *G06F 21/567* (2013.01); *G06F 2221/034* (2013.01)

(58) Field of Classification Search
CPC ............. H04L 63/1416; H04L 63/1425; H04L 63/1441; G06F 2221/033; G06F 21/554
See application file for complete search history.

(56) References Cited

U.S. PATENT DOCUMENTS

| | | | |
|---|---|---|---|
| 8,776,228 B2* | 7/2014 | Natarajan | H04L 63/1408 235/376 |
| 8,839,429 B2* | 9/2014 | Komaromy | G06F 21/52 711/125 |
| 9,015,838 B1* | 4/2015 | Northup | H04L 9/005 713/188 |
| 9,342,348 B2* | 5/2016 | Goyal | G06F 9/46 |
| 9,571,509 B1* | 2/2017 | Satish | G06F 21/566 |
| 9,652,615 B1* | 5/2017 | Watson | G06F 21/562 |
| 2003/0023865 A1* | 1/2003 | Cowie | G06F 21/563 726/24 |
| 2008/0263669 A1* | 10/2008 | Alme | G06F 21/56 726/24 |
| 2009/0199297 A1* | 8/2009 | Jarrett | G06F 21/566 726/24 |
| 2012/0210428 A1* | 8/2012 | Blackwell | G06F 11/3006 726/23 |

(Continued)

*Primary Examiner* — Yonas Bayou
(74) *Attorney, Agent, or Firm* — Blank Rome, LLP

(57) ABSTRACT

A collection of techniques allow for the detection of covert malware that attempts to hide its existence on a system by leveraging both trusted hardware event counters and the particular memory addresses (as well as the sequences of such addresses) of the instructions that are generating the suspected malicious activity. By monitoring the address distribution's specific patterns over time, one can build a behavioral model (i.e., "fingerprint") of a particular process—and later attempt to match suspected malicious processes to the stored behavioral models. Whenever the actual measured behavior of a suspected malicious process fails to match said stored behavioral models, the system or system administrator may attempt to perform rehabilitative actions on the computer system to locate and remove the malware hiding on the system.

25 Claims, 5 Drawing Sheets
(2 of 5 Drawing Sheet(s) Filed in Color)

(56) References Cited

U.S. PATENT DOCUMENTS

2012/0255012 A1* 10/2012 Sallam .................... G06F 21/52
                                                    726/24
2015/0101048 A1*  4/2015 Sridhara ................. G06F 21/55
                                                    726/23
2015/0373035 A1* 12/2015 Patne .................. H04L 63/1416
                                                    726/23

* cited by examiner

HARDENED EVENT COUNTERS FOR ANOMALY DETECTION

TECHNICAL FIELD

Embodiments described herein generally relate to malware detection and, in particular, to the detection of malware (and other anomalies) via the use of trusted hardware event counters and various analytic techniques, such as fingerprinting and machine learning.

BACKGROUND ART

Rootkits are a stealthy type of malicious software (malware) designed to hide the existence of certain processes or programs from normal methods of detection. Rootkits typically enable continued privileged access to the compromised system. Rootkit installation may be automated or activated when an attacker obtains root or Administrator access. Obtaining this access may be either a result of direct attack on a system, exploiting a known vulnerability, or by getting access to a password (by cracking, privilege escalation, or social engineering). Once installed, a rootkit typically attempts to hide the intrusion, as well as to maintain privileged access for itself (or other processes).

Rootkit detection is difficult because a rootkit may be able to subvert the software that is intended to find it. Detection methods include: using an alternative, trusted operating system, behavioral-based methods, signature scanning, difference scanning, and memory dump analysis. Removal of rootkits can be complicated or practically impossible, especially in cases where the rootkit resides in the kernel. Reinstallation of the operating system may be the only available solution to the problem. When dealing with firmware rootkits, removal may require hardware replacement or specialized equipment.

Modern rootkits do not necessarily elevate access, but are often used to make another software payload undetectable by adding stealth capabilities. Most rootkits are classified as malware, because the payloads they are bundled with are malicious. For example, a payload might covertly steal user passwords, credit card information, computing resources, or conduct other unauthorized activities. A small number of rootkits may be considered utility applications by their users. For example, a rootkit might cloak a CD-ROM-emulation driver, allowing video game users to defeat anti-piracy measures that require insertion of the original installation media into a physical optical drive to verify that the software was purchased legitimately.

Rootkits can run at different privilege levels or modes of a computer environment. User-mode rootkits run at the same mode as most other user applications, rather than low-level system processes. They have a number of possible installation vectors to intercept and modify the standard behavior of application programming interfaces (APIs). Some inject a dynamically linked library (such as a .DLL file, .dylib file, a .so file, or a .shlib file) into other processes, and are thereby able to execute inside any target process to spoof it. Others with sufficient privileges simply overwrite the memory of a target application.

Kernel-mode rootkits (ring 0) and/or rootkits residing in the virtualization layer (sometimes referred to as ring −1) run with the highest operating system privileges by adding code or replacing portions of the core operating system, including both the kernel and associated device drivers. Most operating systems support kernel-mode device drivers, which execute with the same privileges as the operating system itself. As such, many kernel-mode rootkits are developed as device drivers or loadable modules, such as loadable kernel modules or device drivers. This class of rootkit has unrestricted security access. Kernel rootkits can be especially difficult to detect and remove because they operate at the same security level as the operating system itself, and are thus able to intercept or subvert the most trusted operating system operations and thereby "hide" themselves in a stealth-like manner. Rootkits and other malware that hide their existence on a system are difficult to detect and clean from within the scope of the infected operating environment.

Existing solutions that attempt to perform malware and anomaly detection using hardware event counters only contemplate using the time series data of specific counters, i.e., measuring and observing the rate of change in the counters over time. Such an approach has several drawbacks, e.g., the counters will reflect a mixture of events coming from different processes. Thus, it can only be successfully applied when a single workload is consuming a significant part of the system's computing resources. When several processes are running in parallel in any contemporary operating system (OS), it becomes highly problematic to discover the contributions of each particular process to the counters. Various techniques can be applied, e.g., expectation maximization (EM) algorithms, but they will also lack in details.

Thus, what is needed is a system that performs malware (and other anomaly) detection, leveraging both trusted hardware performance and event counters, as well as the addresses of the instructions that are generating the suspected malicious activity. By analyzing the address distribution's specific patterns, one can build a behavioral model (i.e., "fingerprint") of a particular process—and later match malicious processes to the stored behavioral models whenever the actual measured behavior matches said stored behavioral models.

BRIEF DESCRIPTION OF DRAWINGS

The patent or application file contains at least one drawing executed in color. Copies of this patent application publication with color drawing(s) will be provided by the Office upon request and payment of the necessary fee.

DESCRIPTION OF EMBODIMENTS

Figure 1:
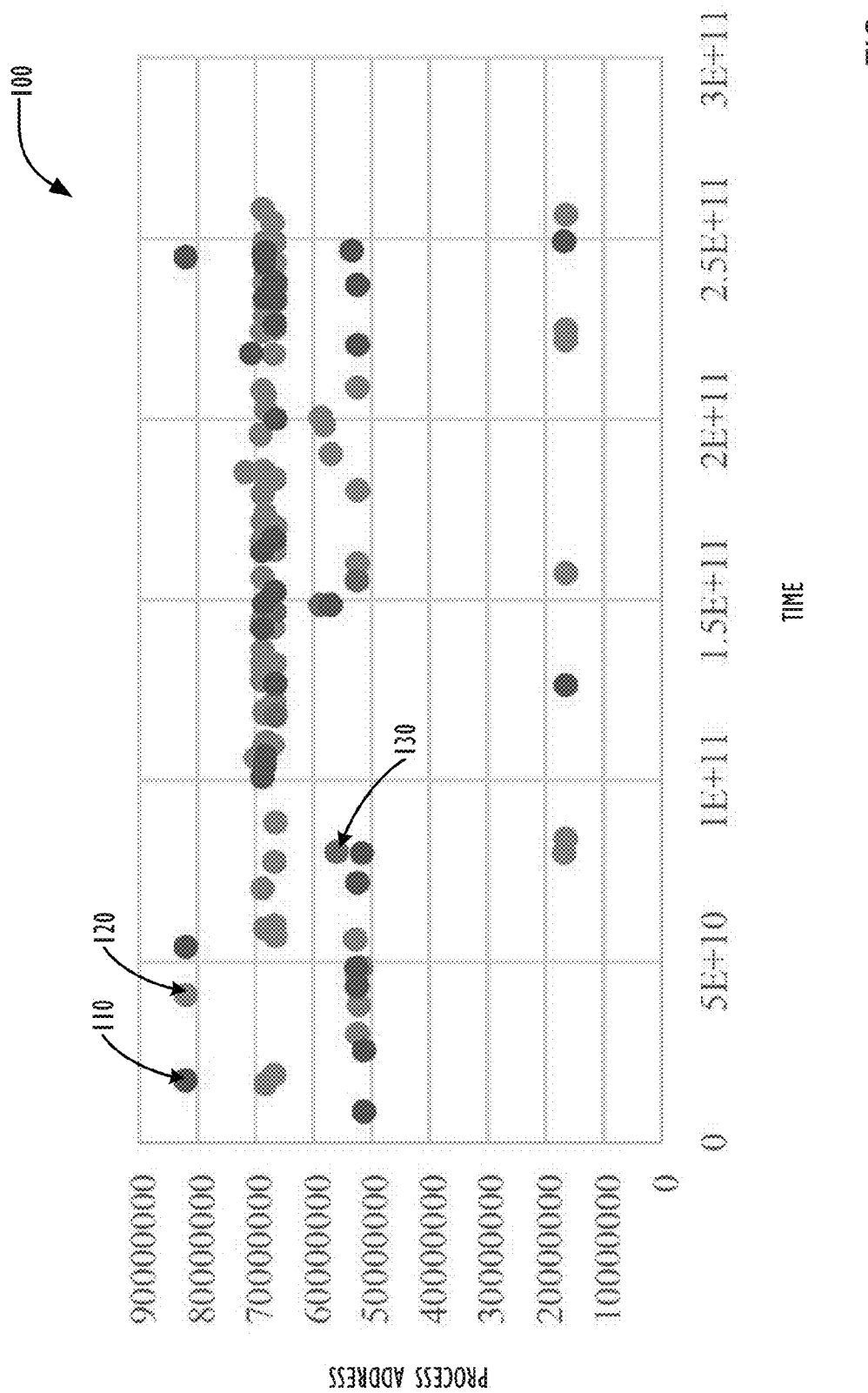
FIG. 1 is a graph illustrating behavioral fingerprinting using a particular subset of event counters over time, according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

Increasingly, cyber-attacks on businesses, government agencies, and others are covert and persistent. As a result, the ability to detect covert communications becomes increasingly more important to being able to deal with threats to intellectual property and personal information theft.

A main element in covering one's tracks involves hiding from software resident in the operating system. A common method of avoiding detection is using malware that is able to hide activities from software such as anti-virus (AV) and host-based intrusion detection. Contemporary threats pay more attention to hiding inside the operating system (e.g., rootkits and bootkits). Bootkits (i.e., rootkits that activate before operating system initiation during the boot process) can control the operating system's interaction with the network hardware. They can also manipulate the AV software installed on the system in order to exploit or disable AV protection. This would render the operating system and software operating under the operating system (including AV or other security software) incapable of seeing or stopping the malicious program activity. Rootkit code may also activate from firmware, which would make it harder to detect and significantly harder to remove.

There are multiple rootkit detection programs in the market, employing different methods. The methods of comparing trusted and potentially tainted information are well known and have been used in many anti-rootkit tools, such as the use of Difference-based detection by Russinovich's RootkitRevealer, which enabled detection of the Sony DRM rootkit. Other examples are F-Secure's Blacklight and McAfee's RootkitDetective, all of which use differential viewing as one of the main detection methods. However, the existing anti-rootkit solutions cannot reliably account for and identify previously unseen variants of known malware code or previously undiscovered malware code. These types of malware would be difficult, if not impossible, to detect using purely software-based, difference-based detection.

Thus, disclosed herein are various techniques to overcome the shortcomings of static analysis via software implementations of malware detection programs. Specifically, disclosed herein are hardware modifications to support secure, efficient, dynamic analysis of programs to detect malware or other anomalies. This approach solves several of the problems with prior art, software-based malware detection techniques.

First, by executing AV protection in secure hardware (with minimum reliance on operating system software and without relying on the integrity of the operating system), the possibility of malware subverting the protection mechanisms is greatly reduced. In other words, the hardware event counters utilized by the techniques described herein can never be reset, and are either invisible or 'read-only' to the OS software. Second, the dynamic analysis of trusted hardware counters and the tracking of accessed instruction memory addresses over time makes the detection of new, undiscovered malware variants easier.

Recognition of the fact that all malware within a certain family of malware, regardless of code variant, attempts to do similar things, at similar relative memory addresses—and in similar patterns—led to the inventions that are disclosed herein. The following are a few examples of the benefits that may be gained from these inventions:

1. High trust and attestation levels: The collected data is highly trustable, and hard to falsify or circumvent. For example, counter data may be signed by platform-bind keys to ensure that it indeed came from a trusted hardware source.
2. Generic to majority of INTEL® platforms: Most recent INTEL® platforms already have all the hardware needed to implement the techniques described herein.
3. OS-agnostic: Collection of information from the counters is fully hardware based, so, if there is a hardware channel to a remote console based on the Converged Security Management Engine, then no enablement is needed in the OS on the machine that is being monitored.
4. Resiliency to OS/Hypervisor/BIOS/UEFI malware: Even in the presence of an OS- or firmware-based advanced persistent threat (APT), data will be collected as usual and securely delivered to the monitoring agent.

As mentioned above, the use of hardware event counters makes the techniques described herein more resilient than traditional software-based AV and malware detection programs. In particular, the INTEL® CPU and Chipset Performance Counters offer a wide breadth of analytical data that may be used to detect malware in two general ways: 1.) some counters are very sensitive to changes in the type/mixture of workload that the system is executing; and 2.) other counters can be considered direct evidence for suspicious behavior.

Examples of some of the conditions that fixed, non-resettable hardware event counters, which report the address of the instructions that caused the respective events, may indicate include the following:
1. Context switches (e.g., user/kernel, VM/Hypervisor)
2. Memory/IO/cache usage, DMA and bus transactions
3. Debug instructions, self-modifying code
4. Crypto opcode statistics
5. Typical patterns of exploitations (e.g., multiple mispredicted branches, changes of stack pointer, etc.)

In some embodiments, the collection of hardware event counter data is carried out using a Trusted Execution Environment-based agent. One possible implementation on INTEL® Architecture platforms comprises the collection of platform counters by an agent running in the Converged Security Management Engine (CSME) 450 over the Platform Environmental Control Interface (PECI) 440, as will be discussed in further detail in FIG. 4, below.

The collection and signing of event counters by an agent running in a Trusted Execution Environment (TEE) keeps the data trusted for threat detection purposes. Doing so ensures a secure path for the data delivery to the analyzing agent—either locally at the endpoint itself, or remotely, in the case of an enterprise threat intelligence back-end system.

CPU Core Counters

One assumption leveraged by the techniques described herein is that any malware installation will change the workload characteristics of the system that it is installed on, due to the additional execution of the malware code. Each counter or ratio monitored by the AV systems described herein will only add a small amount of work to the workload characterization process. Moreover, thresholds may be used for each counter, such that, e.g., only every millionth interrupt to a particular counter is analyzed by the system.

By taking into account the memory address of the interrupt raised when a given counter reaches its threshold, it is possible to determine which process was responsible for the event. Based on this information, it is then possible to analyze a time series of specific counters for specific processes, including an analysis of the distribution of the instruction addresses causing these events. Examples of meaningful CPU core counters (also referred to herein as Performance Monitoring Unit or PMU counters) include:

- Machine clear events to detect code self-modification and changing workload conditions and ratio of MACHINE_CLEARS.CYCLES to CPU_THREAD_UNHALTED
- Store forward miss rate instructions distribution and ratio of: LD_BLOCKS.STORE_FORWARD to INSTRUCTIONS_RETIRED
- Misaligned memory references distribution and ratio of: MISALIGN_MEM_REF.STORES to INSTRUCTIONS_RETIRED. [Malware hooks may be forced to do misaligned memory accesses in an unusual way compared to regular application.]
- ITLB flushes (ITLB_FLUSH) to retired instructions—this could also happen due to code modification
- Distribution of Translation Lookaside Buffer (TLB) misses causing instructions
- Distribution and ratio of indirect calls to direct calls and ratio of conditional branches to normal branches. [Hooking into existing code may add more direct branches (for example when patching the code entry), or change the existing branch pattern.]
- Distribution of general CPU frontend/backend events and limit ratios using IDQ_UOPS_NOT_DELIVERED.CORE, UOPS_ISSUED.ANY, UOPS_RETIRED.SLOTS, INT_MISC_RECOVERY_CYCLES, UOPS_RETIRED.RETIRE_SLOTS can detect changes in the code characteristics.
- LLC miss ratio to instructions, which can be used to estimate memory bandwidth
- Run cycle events for ring 0 and ring !=0 and compare ratios. [Kernel malware would likely increase the ring 0 time. Active bot nets would likely increase the ring 3 time.]
- Ratios using the CPU core C state residency registers (free running counters)
- Ratio of core execution time to idle time. The execution time of the different C-states can be used to estimate the different sleep time "buckets"
- With a bot net running, the wake up patterns of the system would likely be different, as the malware has to wake up to communicate
- Explicit stack pointer change instructions (MOV ESP, xxx; XCHG ESP, etc)
- Traps
- Context Switches
- Power Management Events
- Examples of uncore counters to characterize malware (outside the core)
    - Ratio of MMIO and PCI to memory bandwidth to detect additional IO
    - Average sleeping patterns in C states According to embodiments described herein, the set of counters and corresponding configurations that are deemed suitable for threat detection may be defined using machine learning. Once defined, behavioral models of various processes of interest may be constructed based on local data and/or data from multiple clients (if possible) to define "normal" or expected, i.e., malware-free, behavior. Then, a set of suitable metrics may be used to measure the deviation of the monitored workload from model "normal" workload, along with various anomaly detection algorithms, to provide a more robust malware detection system.

FIG. 1 is a graph 100, illustrating behavioral fingerprinting using a particular subset of event counters (e.g., red dots 110, blue dots 120, and green dots 130 represent three different types of event counters being tracked by the behavioral fingerprinting system) over time, according to one embodiment. The horizontal axis of graph 100 represents time, and the vertical axis represents the process addresses of particular processes that are loaded in system memory at a particular point in time. As may be understood, the address distributions of specific processes over time provides a person or process analyzing the graph 100 with a 'behavioral fingerprint' of the system over the specified time interval. To allow comparison of addresses between different instances of a process (including comparisons of processes running in different computers), it may also be useful to use relative addresses computed from the base load position of a process in memory.

As alluded above, one of the distinguishing features of the embodiments disclosed herein is the use of address information that is available for samples of event counters. Existing solutions known to the inventors use only the time series of specific counters (i.e., the rate of change in the counters over time). Such an approach may have the advantage of being easier to implement, but it also has a significant drawbacks, as it mixes events from different processes. Thus, such approaches may only meaningfully be applied when there is a single workload consuming a significant part of computing resources. When several processes are running in parallel in any contemporary OS, it become highly problematic to be able to discover the specific contributions of each particular process. Various other techniques may be applied, e.g., expectation maximization (EM) algorithms, but these will also lack in detail with respect to the specific contributions of specific processes.

In contrast, the solutions described herein rely on specifically-designed samples (e.g., interrupts that are generated when counters reach a predetermined threshold value, such as every millionth count) and the specific addresses of the instructions where the corresponding events were generated. Memory maps (i.e., mappings of which processes had accesses to a specific memory location over time) are known to OS and thus allow easy selection of counters generated by specific processes. By analyzing the address distribution's specific patterns, one can build a behavioral model (also referred to herein as a "fingerprint") of a process and later match wherever actual behavior matches said model.

Figure 2:
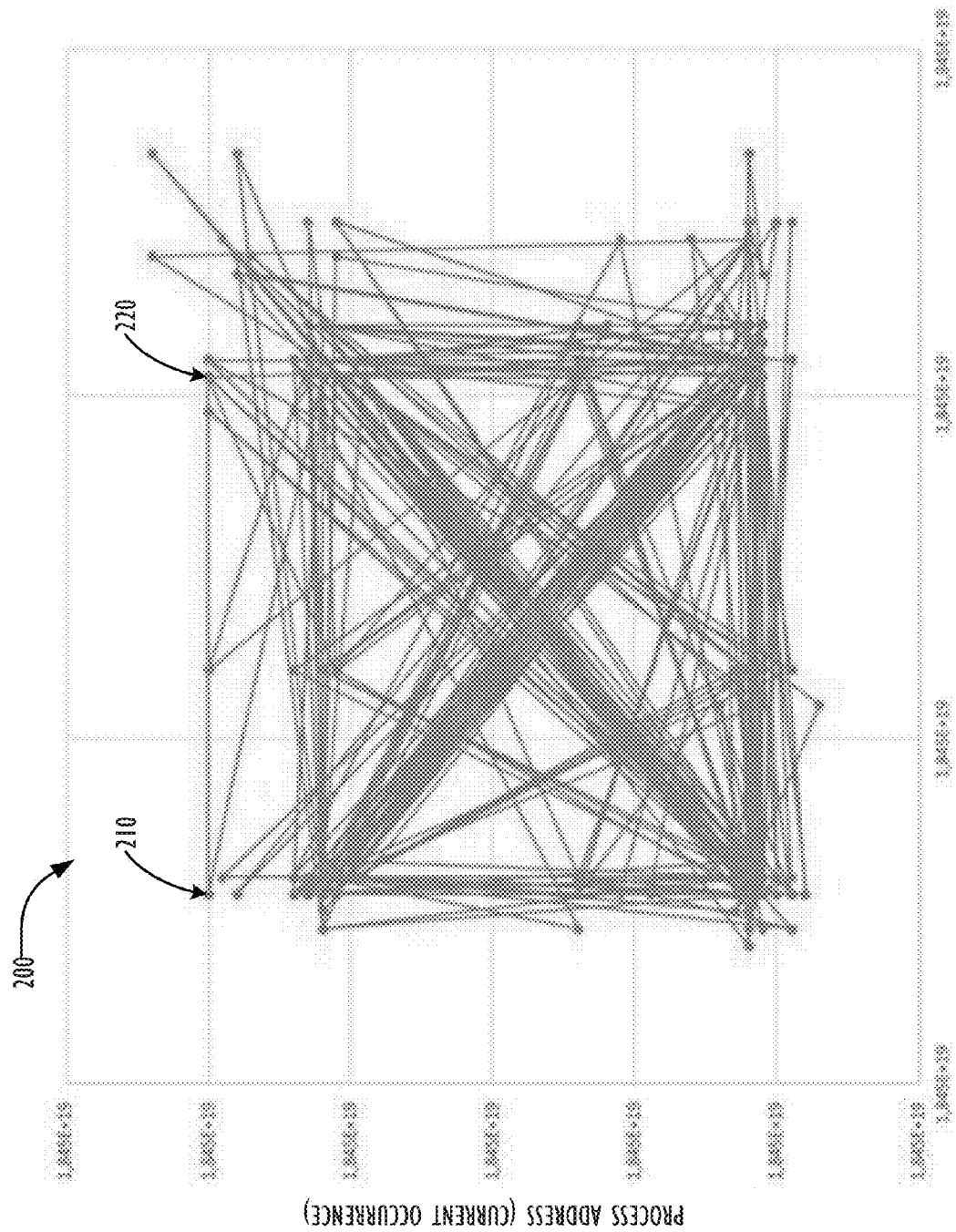
FIG. 2 is a graph illustrating behavioral fingerprinting using a 'phase' space of a particular subset of event counters in the same timeframe, according to one embodiment.

Turning to FIG. 2, a graph 200 is depicted, illustrating behavioral fingerprinting using a 'phase' space of a particular subset of event counters in the same timeframe, according to one embodiment. The horizontal axis of graph 200 represents the process address of the "previous" occurrence of a particular process, and the vertical axis represents the process address of the "current" occurrence of the particular process. As may be understood, the 'phase' space shown is for a plurality of individual counters (e.g., counter 210 and counter 220) that represent the addresses of samples for different events that happened in the same time frame. Two points on the graph connected by a line segment represent a "from-to" transition in the code of a process. Therefore, the transitions illustrated in FIG. 2, e.g., between 210 and 220, are uni-directional in nature. According to some embodiments, the number of transitions monitored is based, at least in part, on a type of event that is associated with the particular hardware counter being monitored. Using a 'phase' space, such as is illustrated in FIG. 2 can provide an even more nuanced fingerprint of the typical behavior pattern of a process than the address distribution map shown in FIG. 1. After a phase space fingerprint has been established, any aberrations to that pattern (e.g., an unusual number of transitions between particular addresses, or transitions between addresses where none should be present) can indicate potential anomalies within the system.

Figure 3:
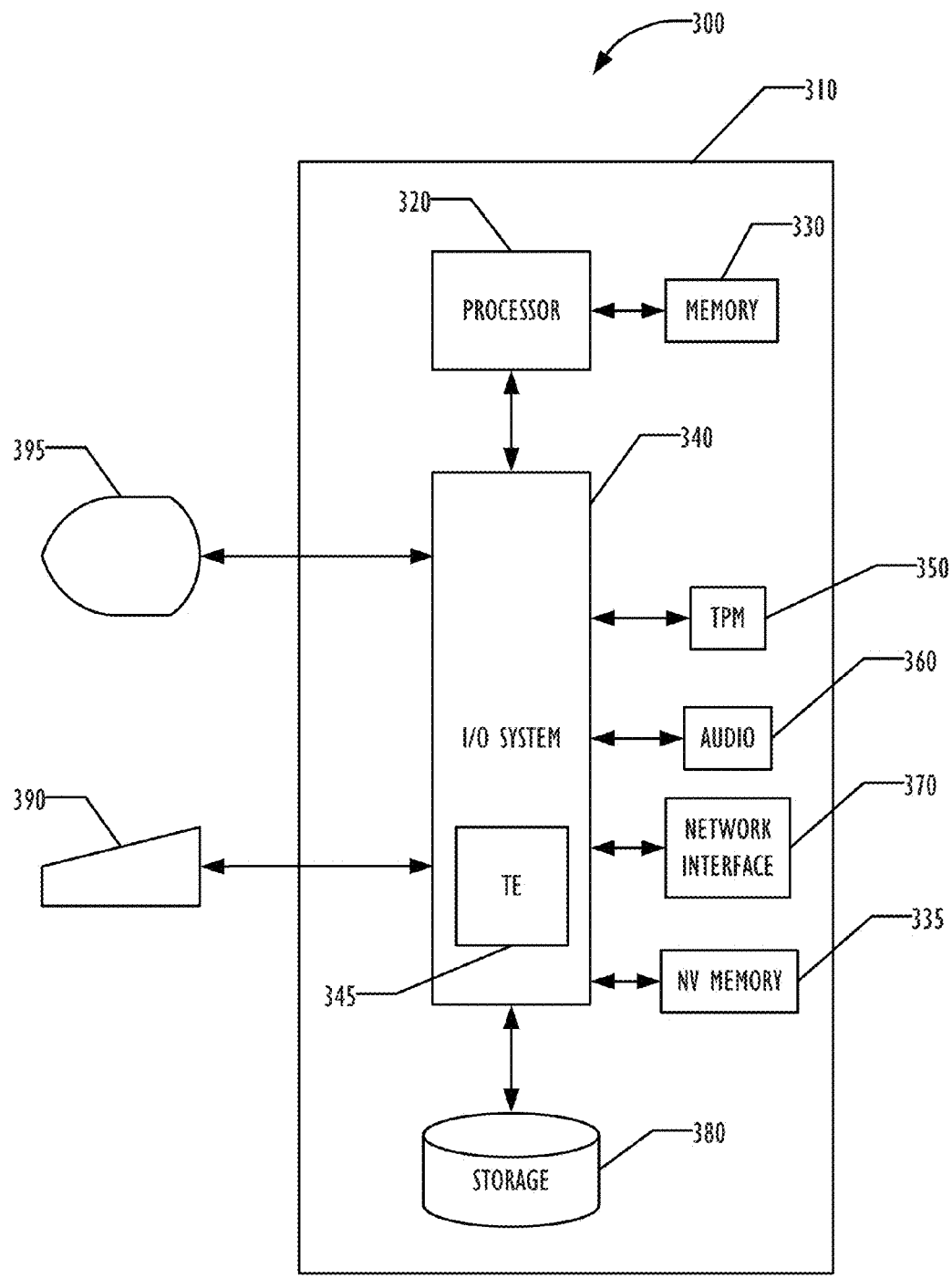
FIG. 3 is a block diagram illustrating a computer system for detecting rootkits or other anomalies, according to one embodiment.

FIG. 3 is a block diagram illustrating a computer system 300 that may be used to implement some or all of the techniques described herein. A system unit 310 provides a location where components of the computer system 300 may be mounted or otherwise disposed. The system unit 310 may be manufactured as a motherboard on which various chipsets are mounted, providing electrical connection between the components and signal and power distribution throughout the system unit 310 and external to the system unit 310 as desired. For example, the computer system 300 may include an output device such as display 395, which provides a way to display alerts or other indications that the anti-malware system has detected the possibility of an anomaly by examining hardened platform counters.

Figure 5:
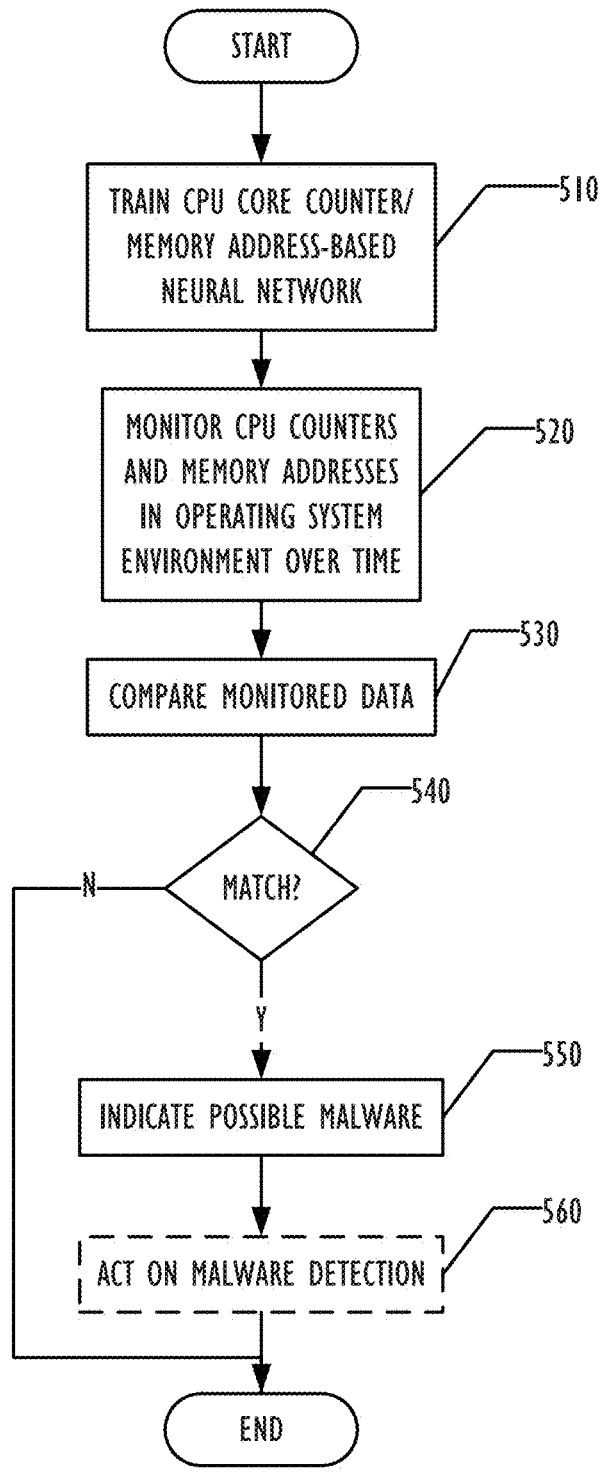
FIG. 5 is a flowchart illustrating a technique for detecting malware, according to one embodiment.

Various components of the system unit 310 may include one or more processor 320, typically each a single processor chip mounted in a mounting socket (not shown in FIG. 3) to provide electrical connectivity between the processors 320 and other components of the computer 300. Although a single processor 320 is illustrated in FIG. 3, any desired number of processors can be used, each of which may be a multi-core processor. Multiple processor chips are available on the market currently, and any desired processor chip or chipset may be used. The system unit 310 may be programmed to perform methods in accordance with this disclosure, an example of which is illustrated in FIG. 5.

The processor 320 is connected to memory 330 for use by the processor 320, typically using a link for signal transport that may be a bus or any other type of interconnect, including point-to-point interconnects. Memory 330 may include one or more memory modules and comprise random access memory (RAM), read only memory (ROM), programmable read only memory (PROM), programmable read-write memory, and solid-state memory. The processor 320 may also include internal memory, such as cache memory. An operating system running on the processor 320 generally controls the operation of the computer system 300, providing an operating system environment for services, applications, and other software to execute on the computer 300.

As illustrated in FIG. 3, processor 320 is also connected to a I/O subsystem 340 that provides I/O, timer, and other useful capabilities for the computer system 300. For example, the I/O subsystem 340 may provide I/O ports for connecting an optional display 395 and an optional input device 390, such as a keyboard, mouse, touch screen, to the system unit 310. The ports may be either one or more of special-purpose ports for components like the display 395 or multipurpose ports such as Universal Serial Bus (USB) ports for connecting a keyboard or mouse 390. The I/O subsystem 340 may also an interface for communicating with storage devices such as storage device 380, connect to audio devices through an audio interface 360, and connect to the network 120 via network interface 370. The storage device 380 represents any form of non-volatile storage including, but not limited to, all forms of optical and magnetic, including solid-state storage elements, including removable media, and may be included within system unit 310 or be external to system unit 310. Storage device 380 may be a program storage device used for storage of software to control computer 300, data for use by the computer 300 (including network flow data), or both. Although only a single storage device 380 is illustrated in FIG. 3 for clarity, any number of storage devices 380 may be provided as desired, depending on interface availability. The I/O subsystem 340 may be implemented as one or more chips within the system unit 310. In some embodiments, the memory 330 may be connected to the I/O subsystem 340 instead of to the processor 320.

In addition, some embodiments may connect the I/O subsystem 340 to a Trusted Platform Module 350 that provides a cryptoprocessor for storing cryptographic keys to protect information. Embodiments may implement the functionality of the I/O subsystem 340 as one or more separate chips in the system unit 310.

As illustrated in FIG. 3, the I/O subsystem 340 provides hardware resources for the secure trusted environment (TE) 345. The TE 345 provides a secure environment not controlled by the operating system that controls the computer 300. In other embodiments, the TE 345 may be outboard of the I/O subsystem as a separate chipset, or may be incorporated in the processor 320, such as a separate core restricted to TE functionality. The TE 345 contains secure processing functionality that allows performing the secure environment side of the hardened event counter techniques described herein in a trusted environment that cannot be interfered with by malware—even malware that may run as a bootkit or rootkit on processor 320. Typically, vendors providing the TE 345 use proprietary or cryptographic techniques to ensure control over what functionality may execute in the TE 345, preventing execution of any but carefully vetted trusted programs to run in the TE 345. Special interfaces may be provided to allow software running on the processor 320 to request the TE 345 to perform desired functionality, such as initiating hardware-protected counter analysis or providing data from the TE 345 to the processor 320 for analysis. The TE 345 may either use its own internal memory or use a portion of the memory 330 for data and firmware storage. Alternatively, instructions in the form of firmware for execution in the TE 345 may be loaded from a non-volatile memory device 345, such as a flash memory, upon powering up of the computer 300, and then loaded into a portion of the memory 330 for execution by the TE 345. In some embodiments, the TE 345 may be disabled and enabled as desired. These instructions may cause the TE 345 to perform hardened event counter analysis and other functionality not described herein. The hardened event counter firmware may be provided by the secure environment vendor or may be provided by an intrusion detection system vendor and stored as firmware by permission of the secure environment vendor, in conjunction with the provision of operating system environment intrusion detection software. An example of a trusted environment that may be used for these techniques is the Manageability Engine (ME) in certain chipsets provided by INTEL® Corp. Although described herein generally in terms of a hardware-based TE 345, secure environments, e.g., the Intel® SGX type of TE, may be implemented in hardware, firmware, or software, or any combination thereof, as desired.

The computer system 300 may be any type of computing device, such as, for example, a smart phone, smart tablet, personal digital assistant (PDA), mobile Internet device (MID), convertible tablet, notebook computer, desktop computer, server, or smart television. The display 395, if present, may be any time of device for presenting an interface to the user, such as, for example, a touch screen or a liquid crystal display. The elements illustrated in FIG. 3 are illustrative and given by way of example only. The elements shown in FIG. 3 may be combined or divided into multiple elements as desired. Other elements, such as geo-positioning logic provided by a Global Positioning System (GPS) transceiver, as well as logic for handling mobile communications using standards such as, for example, IEEE 802.11, IEEE 802.16, WiMax, etc., may also be provided as desired.

Figure 4:
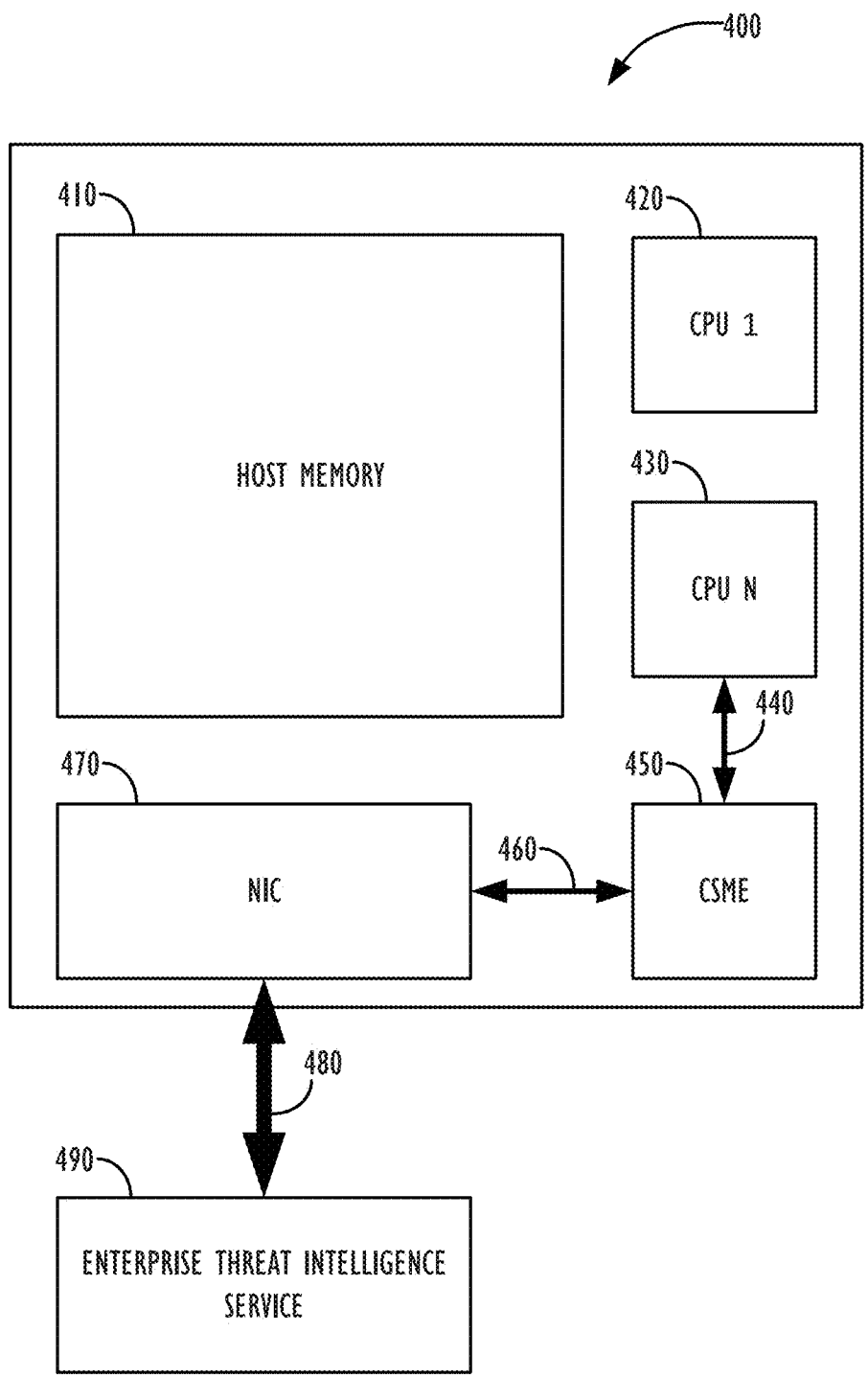
FIG. 4 is a block diagram illustrating a computer system for detecting rootkits or other anomalies, according to another embodiment.

Turning now to FIG. 4, a block diagram illustrating a computer system 400 for detecting rootkits or other anomalies is shown, according to another embodiment. Computer system 400 may comprise: host memory 410, and multiple CPUs (420, 430, etc.) communicatively coupled to Converged Security Management Engine (CSME) 450 via the Platform Environmental Control Interface (PECI) 440, which may in turn be connected to a Network Interface Card, e.g., an Ethernet controller, (NIC) 470 via the Network Controller Sideband Interface (NC-SI) 460. The NC-SI provides the interconnection and protocol, whereby the CSME 450 can use the NIC for its own network traffic without interruption from the host OS and/or when the OS is not present. According to some embodiments, the collection of hardware counter data is done using a TEE-based agent running in CSME 450 over the PECI 440. In other embodiments, signing of counter data by platform-bind keys may be done to ensure that the keys indeed have come from a trusted source. In implementations where further security is desired, computer system 400 may use NIC 470 to communicate with an Enterprise Threat Intelligence Service (490) only via a trusted tunnel (480), in order to ensure that the hardware counter information is not interfered with or intercepted by an untrusted process.

Examples of rule-based anomalies that may be detected by a system such as computer system 400 include: 1.) an abnormal level of activity on an exchange server over a weekend; 2.) a production system that is not virtualized that is suddenly seeding vmenter/vmexit events; 3.) the presence of self-modified code on the system; or 4) the explicit change of a stack pointer when in user mode.

Examples of the types of analytical operations that may be performed by a system such as computer system 400 include: 1.) detecting an abnormal amount of web traffic going inside the datacenter, e.g., by performing traffic analysis, including detecting what computers are communicating to what other computers and/or how many distinct hosts each computer is communicating with (this can be detected, e.g., by detecting changes in the process behavior of network drivers, OS kernels, etc.); and 2.) detecting a continued dribble of failed login attempts, e.g., a few attempts per service per day, which may indicate that someone is doing a low-intensity dictionary attack (this will increase the number of samples for code regions processing failed login attempts—a region of code that is not normally highly active).

As will now be appreciated, hardware event counters on their own (with few exceptions, like self-modified code or explicit stack pointer changes) will not indicate which process is responsible for the suspicious behavior. That is to say, without some other source of process information (e.g., from an OS agent), a full anomaly detection regime is not possible. This information can, however, be used for intrusion detection, which will indicate to admin that something needs to be investigated further. Another possible technique to leverage the resilience of protected hardware platform counters would be to perform 'sanity checks' on data received from an OS user agent. This technique would complement attempts to perform rootkit detection by using hardware resources to detect inconsistence in network traffic. While an advanced persisted threat (APT) or a rootkit may be able to hinder the OS user agent, it would be very hard for the malicious process to make its statistics match those that are reported by the OS user agent. This, in itself, may be used to indicate to a system administrator that something is potentially wrong. For example, rootkits habitually hide their own CPU usage, which will make the data reported by the OS user agent not add up to what the hardware counters show—thus alerting a system administrator to a possible anomaly.

Additional approaches for performing analytical inquiries based on hardware platform counters may comprise utilizing profiles/ontologies developed by an Enterprise Threat Intelligence Service, i.e., a secure collaborative client-cloud analytics relationship.

FIG. 5 is a flowchart illustrating various embodiments of operating system and secure environment hardware platform monitoring techniques. In block 510 of FIG. 5, the CSME 450 (or whatever other TEE-based agent is used in a given implementation) monitors a desired set of hardware platform counters, collecting address distribution data, such as is illustrated in chart 100 of FIG. 1 and/or 'phase' space data, such as is illustrated in chart 200 of FIG. 2, in order to build up 'fingerprints' for the processes that are desired to be monitored within the operating system. The process of block 510 may thus be used to build up and train a 'neural network' or other machine learning-based network as to the expected platform counter-based characteristics of 'normal' system processes that are desired to be monitored for the presence of anomalies. Techniques for monitoring and collecting process address data are well known, and one of skill in the art would not need additional description to implement in CSME 450. The collected platform counter data may be stored in accordance with any desired counter storage protocol. The collected counter data may be stored in the memory 330, on storage device 380, or elsewhere on or outboard of the system unit 310, including transmission from the computer 300 to an external device.

In block 520, an operating system environment anomaly detection system or other software for monitoring anomalies may collect similar hardware platform counter data. The software typically uses the same format and protocols as that used by the CSME 450, for ease of comparison of the two data sets, but may use collection and storage techniques that differ, if so desired. Although malware may hide data from the operating system environment monitoring, that hiding can be detected in block 530 by using an intelligently-selected collection of hardware platform counters, where the monitored data from hardware platform counters at block 520 is compared to the stored 'fingerprints' representing 'normal' behavior collected at block 510. In another embodiment, this 'normal' fingerprint may be obtained in a controlled 'clean' or 'test' environment and then delivered for comparison on the monitored platform at block 530.

Both the anomaly detection system and the CSME 450 may monitor the platform counters continuously or during designated periods. If not monitoring continuously, the platform counters may be monitored for predetermined time periods on a periodic or other basis, upon a request to do so, or until a predetermined amount of counter events have been recorded. Similarly, the comparison may be performed in various ways, such as periodically, upon request, or upon filling whatever space is allocated for storing the counter event information.

Differential comparison of data is well known to the art, and need not be further described herein to the person of ordinary skill in the art. In the present situation, the comparison is looking for differences in platform counter characteristics/behavior between the baseline 'fingerprint' models and the counter data that is collected from the operating system environment data.

In block 540, if the trusted, i.e., 'fingerprint' data is not the same as the operating system environment data, e.g., if it differs by a predetermined threshold from the baseline 'fingerprint' models, that difference may indicate the presence of malware or other anomalies. An alert may be generated in block 550. The alert may be generated either in the trusted environment or in the operating system environment, and may take any desired form, such as a message displayed on the computer 110, an alert message sent to an external facility (e.g. via a network), or an alert transmitted to the host-based intrusion detection system from the trusted environment. Although referred to here as a message, the content and delivery technique may be any convenient or desired technique. In some embodiments, for example where the comparison of block 530 simply detects a difference in the monitored data without further analysis, the alert may be accompanied with a transmission of the two data sets to an analysis facility, which may be on the computer 110 or elsewhere. If on the computer 110, the analysis facility may be in the CSME 450 or the operating system environment. The latter risks possible further manipulation by malware, but may be easier to implement than in the CSME 450. The analysis facility may then undertake further analysis of the differences, and possible recognition of malware or other anomalies.

The analysis facility may receive and compare the two monitor datasets either synchronously (real-time or near real-time) or asynchronously (for example, on a schedule or periodic basis), or any mixture of the two.

In some embodiments, in block 560, the alert may trigger a response, causing action to be taken responsive to detecting the presence of the malware. The rehabilitative response may take any desired form, including attempting to identify the nature of the malware using other techniques, attempting to rehabilitate the computer 100 by removing the malware, quarantining the computer 100, or attempting to take an action against an external actor that is identified as the cause of the anomaly. The nature of those rehabilitative techniques is not described here, except that actions may be taken on the computer 100, on an external system, or both. In embodiments in which a response is taken to the alert, the analysis facility may both do the analysis and take the action, or the analysis facility may only perform the analysis and leave the responsive action to be taken by another facility, which may be in a different location than the analysis facility. The action taken responsive to the alert may also involve communication with and actions by the CSME 450.

The following examples pertain to further embodiments.

Example 1 is a non-transitory computer readable medium with instructions stored thereon, the instructions comprising instructions that when executed cause a computer system to: monitor a first set of hardware counters of the computer system over a first time period, producing first fingerprint data for each of one or more operating system processes; monitor the first set of hardware counters of the computer system over a second time period in a secure environment not controlled by the operating system of the computer system, producing first runtime data for each of one or more operating system processes; compare the first runtime data for each of the one or more operating system processes with the first fingerprint data for the corresponding operating system process; and indicate whether the first runtime data for any of the one or more operating system processes differs by a predetermined threshold from the first fingerprint data for the corresponding operating system process.

Example 2 includes the subject matter of example 1, wherein the instructions that, when executed, cause the computer system to monitor a first set of hardware counters of the computer system over a first time period comprise instructions that, when executed, cause the computer system to: monitor memory addresses corresponding to the first set of hardware counters during the first time period.

Example 3 includes the subject matter of example 1, wherein the instructions that, when executed, cause the computer system to monitor the first set of hardware counters of the computer system over a second time period comprise instructions that, when executed, cause the computer system to: monitor memory addresses corresponding to the first set of hardware counters during the second time period.

Example 4 includes the subject matter of any of examples 1-3, wherein the first set of hardware counters comprises a hardware counter corresponding to at least one of the following events: machine clear, cache miss, branch miss, self-modifying code, debugging event, single step event, store forward miss, misaligned memory reference, ITLB flush, TLB miss, indirect call, conditional branch, trap, context switch, power management event, and explicit stack pointer change instruction.

Example 5 includes the subject matter of any of examples 1-3, wherein the instructions that, when executed, cause the computer system to monitor a first set of hardware counters of the computer system over a first time period further comprise instructions that, when executed, cause the computer system to: monitor relative memory addresses corresponding to the first set of hardware counters during the first time period, wherein the relative memory addresses are computed from a base load position of a process in memory.

Example 6 includes the subject matter of any of examples 1-3, wherein the instructions that, when executed, cause the computer system to monitor a first set of hardware counters of the computer system over a first time period comprise instructions that, when executed, further cause the computer system to: monitor the first set of hardware counters of a second computer system over the first time period; combine the monitored first set of hardware counters of the second computer system with the monitored first set of hardware counters of the computer system; and produce first fingerprint data for each of one or more operating system processes using the combined monitored first set of hardware counters of the second computer and the monitored first set of hardware counters of the computer system.

Example 7 includes the subject matter of any of examples 1-3, wherein the instructions that, when executed, cause the computer system to monitor a first set of hardware counters of the computer system over a first time period comprise instructions that, when executed, cause the computer system to: monitor a number of transitions of memory addresses corresponding to at least one of the first set of hardware counters during the first time period.

Example 8 includes the subject matter of example 1, wherein the first fingerprint data is monitored from a controlled test environment.

Example 9 includes the subject matter of example 1, wherein at least one of the hardware counters in the first set of hardware counters comprises a hardware counter that may not be reset.

Example 10 is a method of detecting anomalies, comprising: monitoring a first set of hardware counters of a computer system over a first time period, producing first fingerprint data for each of one or more operating system processes; monitoring the first set of hardware counters of the computer system over a second time period in a secure environment not controlled by the operating system of the computer system, producing first runtime data for each of one or more operating system processes; comparing the first runtime data for each of the one or more operating system processes with the first fingerprint data for the corresponding operating system process; and indicating whether the first runtime data for any of the one or more operating system processes differs by a predetermined threshold from the first fingerprint data for the corresponding operating system process.

Example 11 includes the subject matter of example 10, wherein monitoring a first set of hardware counters of the computer system over a first time period comprises: monitoring memory addresses corresponding to the first set of hardware counters during the first time period.

Example 12 includes the subject matter of example 11, wherein monitoring a first set of hardware counters of the computer system over a second time period comprises: monitoring memory addresses corresponding to the first set of hardware counters during the second time period.

Example 13 includes the subject matter of any of examples 10-12, wherein the first set of hardware counters comprises a hardware counter corresponding to at least one of the following events: machine clear, cache miss, branch miss, self-modifying code, debugging event, single step event, store forward miss, misaligned memory reference, ITLB flush, TLB miss, indirect call, conditional branch, trap, context switch, power management event, and explicit stack pointer change instruction.

Example 14 includes the subject matter of any of examples 10-12, wherein monitoring a first set of hardware counters of the computer system over a first time period comprises: monitoring relative memory addresses corresponding to the first set of hardware counters during the first time period, wherein the relative memory addresses are computed from a base load position of a process in memory.

Example 15 includes the subject matter of any of examples 10-12, wherein monitoring a first set of hardware counters of the computer system over a first time period further comprises: monitoring the first set of hardware counters of a second computer system over the first time period; combining the monitored first set of hardware counters of the second computer system with the monitored first set of hardware counters of the computer system; and producing first fingerprint data for each of one or more operating system processes using the combined monitored first set of hardware counters of the second computer and the monitored first set of hardware counters of the computer system.

Example 16 includes the subject matter of any of examples 10-12, wherein monitoring a first set of hardware counters of the computer system over a first time period comprises: monitoring a number of transitions of memory addresses corresponding to at least one of the first set of hardware counters during the first time period.

Example 17 includes the subject matter of example 10, wherein the first fingerprint data is monitored from a controlled test environment.

Example 18 includes the subject matter of any of examples 10-12, wherein monitoring a first set of hardware counters of the computer system over a second time period comprises: monitoring a number of transitions of memory addresses corresponding to at least one of the first set of hardware counters during the second time period.

Example 19 includes the subject matter of example 18, wherein the number of transitions monitored is based, at least in part, on a type of event that is associated with the at least one of the first set of hardware counters.

Example 20 is a computer system, comprising: a processor; an operating system, comprising instructions that when executed by the processor control the processor and provide an operating system environment for other software to execute on the processor; an anomaly detection software, comprising instructions that, when executed by the processor, cause the processor to: monitor a first set of hardware counters of the computer system over a first time period, producing first fingerprint data for each of one or more operating system processes; monitor the first set of hardware counters of the computer system over a second time period in a secure environment not controlled by the operating system of the computer system, producing first runtime data for each of one or more operating system processes; compare the first runtime data for each of the one or more operating system processes with the first fingerprint data for the corresponding operating system process; and indicate whether the first runtime data for any of the one or more operating system processes differs by a predetermined threshold from the first fingerprint data for the corresponding operating system process.

Example 21 includes the subject matter of example 20, wherein the instructions that, when executed, cause the processor to monitor a first set of hardware counters of the computer system over a first time period comprise instructions that, when executed, cause the processor to: monitor a number of transitions of memory addresses corresponding to at least one of the first set of hardware counters during the first time period.

Example 22 includes the subject matter of example 20, wherein the first fingerprint data is monitored from a controlled test environment.

Example 23 includes the subject matter of example 20, wherein the instructions that, when executed, cause the processor to monitor a first set of hardware counters of the computer system over a second time period comprise instructions that, when executed, cause the processor to: monitor a number of transitions of memory addresses corresponding to at least one of the first set of hardware counters during the second time period.

Example 24 includes the subject matter of example 23, wherein the number of transitions monitored is based, at least in part, on a type of event that is associated with the at least one of the first set of hardware counters.

Example 25 includes the subject matter of example 20, wherein the instructions that, when executed, cause the processor to monitor a first set of hardware counters of the computer system over a first time period comprise instructions that, when executed, cause the processor to: monitor relative memory addresses corresponding to the first set of hardware counters during the first time period, wherein the relative memory addresses are computed from a base load position of a process in memory.

Example 26 includes the subject matter of example 20, wherein the instructions that, when executed, cause the computer system to monitor a first set of hardware counters of the computer system over a first time period comprise instructions that, when executed, cause the computer system to: monitor memory addresses corresponding to the first set of hardware counters during the first time period.

Example 27 includes the subject matter of example 26, wherein the instructions that, when executed, cause the computer system to monitor the first set of hardware counters of the computer system over a second time period comprise instructions that, when executed, cause the computer system to: monitor memory addresses corresponding to the first set of hardware counters during the second time period.

Example 28 includes the subject matter of any of examples 21, 26, or 27, wherein the first set of hardware counters comprises a hardware counter corresponding to at least one of the following events: machine clear, cache miss, branch miss, self-modifying code, debugging event, single step event, store forward miss, misaligned memory reference, ITLB flush, TLB miss, indirect call, conditional branch, trap, context switch, power management event and explicit stack pointer change instruction.

Example 29 includes the subject matter of any of examples 21, 26, or 27, wherein the instructions stored in the anomaly detection software further comprise instructions that, when executed, cause the computer system to: monitor relative memory addresses corresponding to the first set of hardware counters during the first time period, wherein the relative memory addresses are computed from a base load position of a process in memory.

Example 30 includes the subject matter of any of examples 21, 26, or 27, wherein the instructions that, when executed, cause the computer system to monitor a first set of hardware counters of the computer system over a first time period comprise instructions that, when executed, further cause the computer system to: monitor the first set of hardware counters of a second computer system over the first time period; combine the monitored first set of hardware counters of the second computer system with the monitored first set of hardware counters of the computer system; and produce first fingerprint data for each of one or more operating system processes using the combined monitored first set of hardware counters of the second computer and the monitored first set of hardware counters of the computer system.

Example 31 is a computer system comprising: means for performing the method of any of examples 10-19.

Example 32 is a computer system, comprising: a processor; an operating system, comprising instructions that when executed by the processor control the processor and provide an operating system environment for other software to execute on the processor; an anomaly detection software, comprising instructions that, when executed by the processor, cause the processor to: monitor a number of transitions of memory addresses corresponding to a first set of hardware counters of the computer system over a first time period, producing first fingerprint data for each of one or more operating system processes; monitor a number of transitions of memory addresses corresponding to the first set of hardware counters of the computer system over a second time period in a secure environment not controlled by the operating system of the computer system, producing first runtime data for each of one or more operating system processes; compare the first runtime data for each of the one or more operating system processes with the first fingerprint data for the corresponding operating system process; and indicate whether the first runtime data for any of the one or more operating system processes shows anomalies with the first fingerprint data for the corresponding operating system process.

Example 33 includes the subject matter of example 32, wherein the instructions that, when executed, cause the processor to monitor a first set of hardware counters of the computer system over a first time period comprise instructions that, when executed, cause the processor to: generate an address distribution graph.

Example 34 includes the subject matter of example 32, wherein the instructions that, when executed, cause the processor to monitor a first set of hardware counters of the computer system over a first time period comprise instructions that, when executed, cause the processor to: generate a phase space graph.

Example 35 includes the subject matter of example 32, wherein the instructions that, when executed, cause the processor to monitor a first set of hardware counters of the computer system over a second time period comprise instructions that, when executed, cause the processor to: generate an address distribution graph.

Example 36 includes the subject matter of example 32, wherein the instructions that, when executed, cause the processor to monitor a first set of hardware counters of the computer system over a second time period comprise instructions that, when executed, cause the processor to: generate a phase space graph.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium with instructions stored thereon, the instructions comprising instructions that, when executed, cause a computer system to:

monitor a first set of hardware counters of the computer system over a first time period, thereby producing first fingerprint data for each of one or more operating system processes, wherein the first fingerprint data for each of the one or more operating system processes comprises a phase space graph for one or more of the first set of hardware counters, and wherein each phase space graph comprises a plurality of uni-directional transitions between memory addresses associated with one or more of the first set of hardware counters;

monitor the first set of hardware counters of the computer system over a second time period in a secure environment not controlled by an operating system of the computer system, thereby producing first runtime data for each of one or more operating system processes;

compare the first runtime data for each of the one or more operating system processes with the first fingerprint data for the corresponding operating system process; and indicate whether the first runtime data for any of the one or more operating system processes differs by a predetermined threshold from the first fingerprint data for the corresponding operating system process.

2. The non-transitory computer readable medium of claim 1, wherein the instructions that, when executed, cause the computer system to monitor a first set of hardware counters of the computer system over a first time period comprise instructions that, when executed, cause the computer system to:

monitor memory addresses corresponding to the first set of hardware counters during the first time period.

3. The non-transitory computer readable medium of claim 2, wherein the instructions that, when executed, cause the computer system to monitor the first set of hardware counters of the computer system over a second time period comprise instructions that, when executed, cause the computer system to:

monitor memory addresses corresponding to the first set of hardware counters during the second time period.

4. The non-transitory computer readable medium of claim 1, wherein the first set of hardware counters comprises a hardware counter corresponding to at least one of the following events: machine clear, cache miss, branch miss, self-modifying code, debugging event, single step event, store forward miss, misaligned memory reference, Instruction Translation Lookaside Buffer (ITLB) flush, Translation Lookaside Buffer (TLB) miss, indirect call, conditional branch, trap, context switch, power management event, and explicit stack pointer change instruction.

5. The non-transitory computer readable medium of claim 1, wherein the instructions that, when executed, cause the computer system to monitor a first set of hardware counters of the computer system over a first time period further comprise instructions that, when executed, cause the computer system to:

monitor relative memory addresses corresponding to the first set of hardware counters during the first time period, wherein the relative memory addresses are computed from a base load position of a process in memory.

6. The non-transitory computer readable medium of claim 1, wherein the instructions that, when executed, cause the computer system to monitor a first set of hardware counters of the computer system over a first time period comprise instructions that, when executed, further cause the computer system to:

monitor the first set of hardware counters of a second computer system over the first time period;
combine the monitored first set of hardware counters of the second computer system with the monitored first set of hardware counters of the computer system; and
produce first fingerprint data for each of one or more operating system processes using the combined monitored first set of hardware counters of the second computer system and the monitored first set of hardware counters of the computer system.

7. The non-transitory computer readable medium of claim 1, wherein the instructions that, when executed, cause the computer system to monitor a first set of hardware counters of the computer system over a first time period comprise instructions that, when executed, cause the computer system to:

monitor a number of transitions of memory addresses corresponding to at least one of the first set of hardware counters during the first time period.

8. The non-transitory computer readable medium of claim 1, wherein the first fingerprint data is monitored from a controlled test environment.

9. The non-transitory computer readable medium of claim 1, wherein at least one of the hardware counters in the first set of hardware counters comprises a hardware counter that may not be reset.

10. A method of detecting anomalies, comprising:
monitoring a first set of hardware counters of a computer system over a first time period, thereby producing first fingerprint data for each of one or more operating system processes, wherein the first fingerprint data for each of the one or more operating system processes comprises a phase space graph for one or more of the first set of hardware counters, and wherein each phase space graph comprises a plurality of uni-directional transitions between memory addresses associated with one or more of the first set of hardware counters;
monitoring the first set of hardware counters of the computer system over a second time period in a secure environment not controlled by an operating system of the computer system, thereby producing first runtime data for each of one or more operating system processes;
comparing the first runtime data for each of the one or more operating system processes with the first fingerprint data for the corresponding operating system process; and
indicating whether the first runtime data for any of the one or more operating system processes differs by a predetermined threshold from the first fingerprint data for the corresponding operating system process.

11. The method of claim 10, wherein monitoring a first set of hardware counters of the computer system over a first time period comprises:
monitoring memory addresses corresponding to the first set of hardware counters during the first time period.

12. The method of claim 11, wherein monitoring a first set of hardware counters of the computer system over a second time period comprises:
monitoring memory addresses corresponding to the first set of hardware counters during the second time period.

13. The method of claim 10, wherein the first set of hardware counters comprises a hardware counter corresponding to at least one of the following events: machine clear, cache miss, branch miss, self-modifying code, debugging event, single step event, store forward miss, misaligned memory reference, Instruction Translation Lookaside Buffer (ITLB) flush, Translation Lookaside Buffer (TLB) miss, indirect call, conditional branch, trap, context switch, power management event, and explicit stack pointer change instruction.

14. The method of claim 10, wherein monitoring a first set of hardware counters of the computer system over a first time period comprises:
monitoring relative memory addresses corresponding to the first set of hardware counters during the first time period, wherein the relative memory addresses are computed from a base load position of a process in memory.

15. The method of claim 10, wherein monitoring a first set of hardware counters of the computer system over a first time period further comprises:

monitoring the first set of hardware counters of a second computer system over the first time period;
combining the monitored first set of hardware counters of the second computer system with the monitored first set of hardware counters of the computer system; and
producing first fingerprint data for each of one or more operating system processes using the combined monitored first set of hardware counters of the second computer system and the monitored first set of hardware counters of the computer system.

16. The method of claim 10, wherein monitoring a first set of hardware counters of the computer system over a first time period comprises:
monitoring a number of transitions of memory addresses corresponding to at least one of the first set of hardware counters during the first time period.

17. The method of claim 10, wherein the first fingerprint data is monitored from a controlled test environment.

18. The method of claim 10, wherein monitoring a first set of hardware counters of the computer system over a second time period comprises:
monitoring a number of transitions of memory addresses corresponding to at least one of the first set of hardware counters during the second time period.

19. The method of claim 18, wherein the number of transitions monitored is based, at least in part, on a type of event that is associated with the at least one of the first set of hardware counters.

20. A computer system, comprising:
a hardware processor;
an operating system, comprising instructions that when executed by the processor control the processor and provide an operating system environment for other software to execute on the processor;
an anomaly detection software, comprising instructions that, when executed by the processor, cause the processor to:
monitor a first set of hardware counters of the computer system over a first time period, thereby producing first fingerprint data for each of one or more operating system processes, wherein the first fingerprint data for each of the one or more operating system processes comprises a phase space graph for one or more of the first set of hardware counters, and wherein each phase space graph comprises a plurality of uni-directional transitions between memory addresses associated with one or more of the first set of hardware counters;
monitor the first set of hardware counters of the computer system over a second time period in a secure environment not controlled by the operating system of the computer system, thereby producing first runtime data for each of one or more operating system processes;
compare the first runtime data for each of the one or more operating system processes with the first fingerprint data for the corresponding operating system process; and
indicate whether the first runtime data for any of the one or more operating system processes differs by a predetermined threshold from with the first fingerprint data for the corresponding operating system process.

21. The computer system of claim 20, wherein the instructions that, when executed, cause the processor to monitor a first set of hardware counters of the computer system over a first time period comprise instructions that, when executed, cause the processor to:
monitor a number of transitions of memory addresses corresponding to at least one of the first set of hardware counters during the first time period.

22. The computer system of claim 20, wherein the first fingerprint data is monitored from a controlled test environment.

23. The computer system of claim 20, wherein the instructions that, when executed, cause the processor to monitor a first set of hardware counters of the computer system over a second time period comprise instructions that, when executed, cause the processor to:
monitor a number of transitions of memory addresses corresponding to at least one of the first set of hardware counters during the second time period.

24. The computer system of claim 23, wherein the number of transitions monitored is based, at least in part, on a type of event that is associated with the at least one of the first set of hardware counters.

25. The computer system of claim 20, wherein the instructions that, when executed, cause the processor to monitor a first set of hardware counters of the computer system over a first time period comprise instructions that, when executed, cause the processor to:
monitor relative memory addresses corresponding to the first set of hardware counters during the first time period, wherein the relative memory addresses are computed from a base load position of a process in memory.

* * * * *